L. CIRAC.
STUFFING BOX.
APPLICATION FILED JULY 30, 1910.
1,002,806.
Patented Sept. 5, 1911.
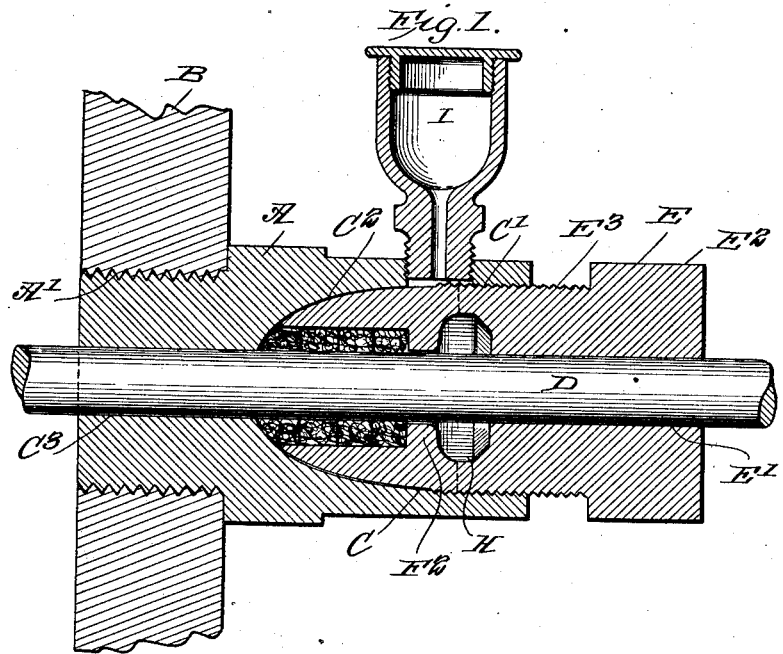
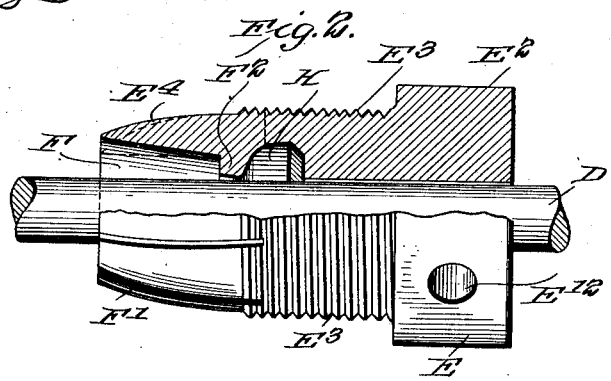
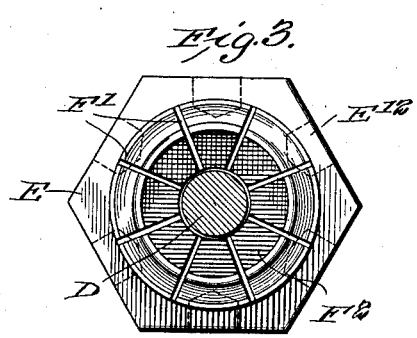
WITNESSES:
INVENTOR
LOUIS CIRAC
BY
ATTORNEYS

UNITED STATES PATENT OFFICE.

LOUIS CIRAC, OF ELY, NEVADA.

STUFFING-BOX.

1,002,806.   Specification of Letters Patent.   Patented Sept. 5, 1911.

Application filed July 30, 1910. Serial No. 574,704.

*To all whom it may concern:*

Be it known that I, LOUIS CIRAC, a citizen of the United States, and a resident of Ely, in the county of White Pine and State of Nevada, have invented certain new and useful Improvements in Stuffing - Boxes, of which the following is a specification.

This invention is an improvement in packing or stuffing boxes for use on piston rods, valve rods, pump plungers or other similar devices wherein packing is utilized to surround a rod or the like; and the invention has for an object to provide a simple construction which can be easily operated to compress the packing and secure a proper packing of the joint and by which lubricant may be supplied directly to the packing through openings in the devices for compressing the packing; and the invention consists in certain novel constructions, and combinations of parts as will be more fully hereinafter described and claimed.

In the drawing Figure 1 is a vertical longitudinal section of the invention as in use. Fig. 2 is a side view, partly in section, of the pressing nut in place on a piston rod. Fig. 3 is an elevation of the slotted end of the nut.

The box A may be threaded at A' for connection with the cylinder head B, or the said box may be made integral with the cylinder head as is well understood by those skilled in the art. This box A when made separate from the cylinder head as shown, ordinarily has an angular portion adjacent to the cylinder head to receive a wrench. The outer end of the box A is provided with a socket C whose bore is threaded at C' adjacent to its outer end and is conical or tapering at its inner end at $C^2$ gradually reducing in size until the conical or tapered wall of the socket communicates with the opening $C^3$ through the box and in which the rod D operates as shown in Fig. 1.

The nut E has an opening E' to fit on the rod D and this nut is provided with an angular portion $E^2$ to receive a wrench and the body of the nut is threaded at $E^3$ to screw in the threaded portion C' of the socket C and the inner end of the nut is sloped or tapered at $E^4$ to coöperate with the conical seat $C^2$ at the inner end of the socket C of the box.

A socket F is formed in the inner end of the nut to receive the packing G and the said inner end of the nut forming the side wall of the socket F is slotted longitudinally at F' to a point beyond the shoulder $F^2$ at the inner end of the socket F and intersecting the counterbore H formed in the nut beyond the shoulder $F^2$ as best shown in Figs. 1 and 2 of the drawing. This counterbore facilitates the compression of the inner slotted end of the nut in securing the desired compression of the packing toward the rod D while the shoulder $F^2$ at the inner end of the socket F operates to secure a compression of the packing in the direction of length of the rod D as the nut is tightened in its socket as will be understood from the drawing. Thus as before suggested, the chamber or counterbore H aids in securing the desired resilience of the inner slotted end of the nut and in furnishing the shoulder $F^2$, which prevents the packing passing back to the inner ends of the slots and thus clogging in a way the compression of the slotted portion.

The packing may preferably be in the form of rings as shown in Fig. 1 and of any suitable material adapted for the purpose of packing a rod or the like.

The angular portion $E^2$ of the nut is adapted to receive an ordinary monkey or other jaw wrench and I also provide it with sockets $E^{12}$ to coöperate with a spanner wrench.

An oil cup I connects with the box A and discharges lubricant to the socket C at a point adjacent to the inner ends of the slots F' of the nut E so the oil will be fed through the slots F' directly to the packing G in the operation of the invention.

It will be noticed that the invention provides for efficient lubrication, convenient renewal of the packing and a ready adjustment of the parts whenever necessary or desired.

I claim:

1. The combination of the box having a rod opening and provided in its outer end with a socket having its bore adjacent to said end threaded and the inner end of said socket being sloped or tapered, gradually reducing toward the rod opening, an oil cup communicating with said socket adjacent to the sloped or tapered portion thereof and a nut having a rod opening and having at its end a sloped or tapered portion corresponding to the sloped or tapered portion of the box socket and provided in said end of the nut with a socket for packing and with a shoulder at the inner end of said socket and with a counterbore beyond the said shoulder, the said nut being provided with a threaded portion screwing in the threaded portion of the box socket, substantially as set forth.

2. The combination of a box having a rod opening and provided in its outer end with a socket communicating with said rod opening and having its bore threaded at its outer end and sloped or tapered at its inner end and a nut conformed to and coöperating with said box, substantially as set forth.

3. A box having a rod opening and a socket communicating therewith and sloped or tapered at its inner end, a member coöperating with said box and having a rod opening and having its inner end slotted and socketed for the reception of packing, the said inner end being adapted to contact with and be compressed by the sloped or tapered inner end of the box, substantially as set forth.

4. A stuffing box comprising a box proper having a rod opening and provided in its outer end with a socket communicating with said opening and having its inner end sloped or tapered and a member coöperating with said box proper and having its end conformed to the sloped or tapered portion of the box socket and adapted to be compressed by contact therewith, said end being slotted longitudinally and socketed for the reception of packing and said member being provided with a shoulder at the inner end of its socket and with a counterbore beyond said shoulder, substantially as set forth.

5. A box having a rod opening and a socket communicating therewith and sloped or tapering at its inner end and provided adjacent to said sloped end with an oil supplying device and a member fitting the socket of the box and having its inner end sloped or tapered to conform to the corresponding portion thereof, said sloped end of the member being socketed for the reception of packing and slotted longitudinally whereby it may be compressed and whereby oil may be passed to packing in the socket of said member, substantially as set forth.

6. In a stuffing box, substantially as described, a nut like member slotted longitudinally from its end and having said slotted end sloped or tapered and provided with a socket in said sloped end with an outwardly facing shoulder at the inner end of said socket and adapted to form an abutment for packing and with a counterbore or recess in rear of said shoulder, substantially as and for the purposes set forth.

LOUIS CIRAC.

Witnesses:
GROVER C. TILFORD,
R. P. MCKERNAN.

---

Copies of this patent may be obtained for five cents each, by addressing the "Commissioner of Patents, Washington, D. C."